United States Patent Office 2,996,629
Patented Aug. 15, 1961

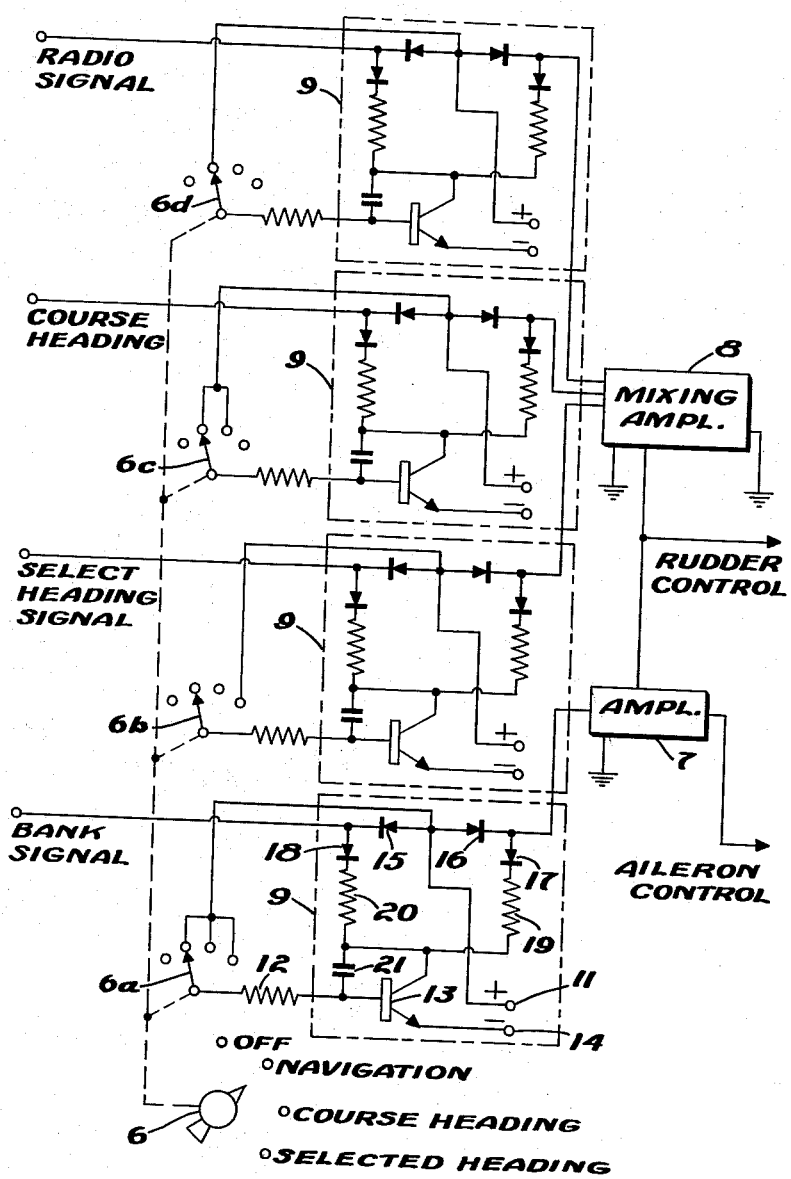

2,996,629
ELECTRONIC FADER CIRCUIT
Melvin H. Rhodes, Kansas City, Mo., assignor to Collins Radio Company, Cedar Rapids, Iowa, a corporation of Iowa
Continuation of application Ser. No. 640,767, Feb. 18, 1957. This application Mar. 19, 1959, Ser. No. 800,586
5 Claims. (Cl. 307—88.5)

This invention relates to aircraft control systems and more particularly to a novel means for eliminating objectionable transients during the switching of the control system from one flight function to another.

The present invention is a continuation of my patent application, Serial No. 640,767, filed February 18, 1957, now abandoned.

One of the main difficulties with present automatic flight control equipments is that changes in the control function of the aircraft affect the flight characteristics of the aircraft. These changes are due to transient signals generated during the switching process in the control system, and many systems have been developed to switch the automatic flight control system from one control function to another without generating such transients. These flight control systems have been expensive to build and have generally not inserted the proper fading characteristics satisfactorily into the flight control system. The definition of fading is well known to one skilled in the art and means generally that the transient signals generated during the switching from one control function or signal to another are slowly and smoothly combined. If these signals are properly faded, no violent movements of the aircraft result when the pilot switches from one flight control function to another.

This invention is a novel fading circuit for utilization with any of the well-known automatic flight control systems. This novel fading circuit combines the low power requirements for switching of a transistor and the low impedance characteristics of unilateral conduction devices when they are conducting to form a new fading circuit. The switching power requirements are very low and the reliability of the system is increased by the use of the transistor. This novel fading circuit uses the rate of charge of a capacitance for controlling the fading rate. It is thus possible by changing the value of the capacitance to vary the fading rate over considerable periods of time.

It is an object of this invention that an automatic flight control system for an aircraft is provided with a fading circuit where the fading circuit is simple and economical to construct. It is another object of this invention that an aircraft control system is provided with a switching means so that any one of a plurality of control signals may be applied to the control surfaces of the aircraft without also applying spurious signals due to switching transients. It is still another object of this invention that in a complete automatic flight control system any one of various flight functions may be quickly and smoothly inserted by operation of one control switch. It is a further object of this invention that an automatic flight control system is provided with a fading circuit where the rate of fading is variable.

These and other objects of this invention will become apparent when the following description is read in conjunction with the accompanying drawing, in which the single figure is a schematic diagram of an aircraft control system including the novel fading circuit of this invention.

This invention provides a novel fading circuit for use in aircraft control systems so that one flight control function signal will be faded into another flight control function signal. As shown in the single figure, the dial selector knob 6 is rotatable by the pilot to select any one of a plurality of flight control functions. These flight control functions as shown include the flight control function called navigation, the flight control function called course heading, and the flight control function called selected heading.

For purposes of this invention, the operation of the invention will be described only with respect to one flight control function, that being the navigation function. The knob 6 is depicted on navigation function in the drawing. The rotatable switch arms 6a, 6b, 6c, and 6d are mechanically connected with the selector knob 6 so that they are also located on their respective second fixed contact elements. The signals, which are to be fed into the control surfaces of the aircraft, such as the rudder and the aileron, are shown as the input signals to each of the novel fading circuits of this invention. With the selector knob 6 set in the navigation position, the bank signal is fed through the novel fading circuit of this invention to the amplifier 7 and then to the aileron controls. The selected heading signal is not utilized when the navigation function is selected. The radio signal and the course heading signals are fed through additional novel fading circuits of this invention to the mixer amplifier 8. The output signal from the mixer amplifier 8 in the navigation function is a combination of the radio signal and the course heading signal. This signal is applied to the rudder control of the aircraft. The basic principles of aircraft control in controlling the ailerons and the rudder in response to the bank signal, the radio signal, and the course heading signal are well known in the art and will not be recited further herein.

The novel fading circuit 9 of this invention will be described with respect to only one occurrence. The operation of the rest of the fading circuits 9 connected to the selected heading signal, the course heading signal, and the radio signal are identical with the operation of the fading circuit 9 connected to the bank signal, which will be described herein.

With the closing of the switch 6a there is applied to the transistor 13 a direct current voltage from the contacts 11 and 14. The positive voltage side of this direct current voltage source is connected through the contact arm 6a, and the resistance 12 to the transistor 13. The application of this voltage across the transistor 13 effectively reduces the impedance of the transistor and permits the flow of current through the transistor. When the current flows through the transistor 13, current will also flow through two identical paths including the diodes 15, 16, 17 and 18 and the resistance elements 19 and 20. The current flow through resistors 19 and 20 results in a drop in the collector voltage of transistor 13. The charge on capacitor 21, which in the quiescent state is charged to the source 11—14, must then follow the drop in collector voltage. It is noted from the figure that capacitor 21, in series with resistor 12, shunts the two parallel collector current paths including resistances 19 and 20 and, thus the charge on capacitor 21 is seen to be related to the current flow through resistors 19 and 20. With a drop in collector voltage, capacitor 21 discharges through the low impedance collector-emitter circuit of transistor 13, through the source 11—14 and resistor 12, and thus develops a negative voltage on the base of transistor 13 proportional to the discharge current flowing through resistor 12. This negative potential is in opposition to the positive potential applied to the base of transistor 13 upon closing of the switch 6a. Thus, capacitor 21, in discharging to follow the drop in collector voltage caused by any increase in the conductivity state of transistor 13, is imparted to the base of transistor 13 as a negative feedback in opposition to the positive voltage tending to force transistor 13 into a state of high conductivity. The speed with which the transistor is turned on is dependent upon the value of the capacitance element 21, and the value of resistance elements 19 and 20. The current will be balanced in both circuits and will vary only with the incoming signal. It is obvious that if this capacitance element 21 is removed, the novel fading circuit 9 of this invention acts as a very fast electronic relay.

As the current flows through the diodes 15 and 16, the impedance of these diodes is changed. When the impedance of these diodes is reduced sufficiently, the amount of signal which flows from the bank signal source to the amplifier 7 is slowly increased due to the controlling action of the transistor upon the amount of current permitted to flow through the diodes. The slow increase in the flow of this signal current which is applied to the amplifier 7 and subsequently to the aileron control surfaces will be faded into any signal already present on the aileron control surfaces. This prevents any violent change in the control surface which would result in a violent movement of the aircraft.

The smooth and controlled switching action of this fading circuit is readily apparent. This action is economically obtainable both as to cost of the individual components and to power consumption. The power required of the voltage source, not shown, connected to terminals 11 and 14 is minimized.

Although this invention has been described with respect to a particular embodiment thereof, it is not to be so limited as changes and modifications may be made therein which are within the full intended scope of the invention as defined by the appended claims.

I claim:

1. An aircraft control signal selection system including a plurality of input information signals, a switch means, a plurality of fading means, amplifier means, a plurality of impedance means each varying as a function of current flow therethrough, each said fading means individually connecting one of said input information signals to said amplifier means through one of said impedance means; each of said fading means comprising an electron discharge device including an input electron control circuit and an output circuit serially connected with one of said variable impedance means, capacitive feedback means connected between the input and output circuits of said electron discharge device whereby the conductivity state of said electron discharge device changes at a predetermined rate, said switch means connected to the input circuit of said electron discharge device and adapted to control the conductivity state thereof; whereby the desired input information signals are serially applied through said variable impedance means and thus faded into said amplifier means for application as control signals to the control surfaces of the aircraft.

2. An aircraft control signal selection system including a plurality of input information signals, switching means, a plurality of fading means, amplifier means, said switching means individually connected to each of said fading means, a plurality of impedance means each variable as a function of current flow therethrough, each of said fading means individually connecting one of said input information signals through one of said variable impedance means to said amplifier means; each of said fading means comprising an electron discharge device including an input electron control circuit and an output circuit, capacitive feedback means connected between said input and output circuits of each of said electron discharge devices whereby the conductivity state of said electron discharge devices may change at a predetermined rate, a power source serially connected through said variable impedance means and said output circuit of each said electron discharge device, biasing means operably connected through said switching means to the input circuit of each of said electron discharge devices, said switching means operable to control the conductivity state of each of said electron discharge devices, whereby said input information signals are connected to said amplifier means at a predetermined rate as determined by said fading means.

3. An aircraft control signal system including a plurality of input information signals, switching means, a plurality of fading means each individually connected to said switching means, each said fading means including an impedance means variable as a function of current flow therethrough, amplifier means, each said fading means individually connecting said input information signals through one of said impedance means to said amplifier means, each said fading means further comprising an electron discharge device having its conductive state controlled by application of voltages of proper polarity through said switch means and including capacitive feedback means, whereby the conductivity state is reversible at a predetermined rate, each said variable impedance means comprising first and second unilateral conduction devices serially connected with opposite polarization with first and second terminals of said series connection connected respectively to one of said information signals and said amplifier means, the junction of said first and second unilateral devices connected to a first power source terminal and the first and second terminals of said series connection additionally connected through said electron discharge device to the second terminal of said power source whereby the control of the current flow in said electron discharge device likewise varies the impedance of said first and second unilateral devices and thereby permits the application of said input information signals to said amplifier means in a time-controlled manner.

4. A fader circuit comprising an electron discharge device including an input electron control circuit and an output circuit, switching means, a supply voltage source, said switching means connecting operating voltages of predetermined polarity from said supply source to said electron discharge device, means controlling the rate of change in the conductivity state of said electron discharge device including capacitive feedback means connected between the output and input circuits thereof whereby a change in the conducivity state of said electron discharge device is instituted by application of said operating voltages by said switching means and effected at a predetermined rate by said feedback means, signal input and output terminals, impedance means serially connected between said signal input and output terminals, said impedance means being variable as a function of current flow therethrough, said impedance means additionally serially connected with the output circuit of said electron discharge device and said supply voltage source, whereby information signals applied to said input terminal are connected to said output terminal at a predetermined rate as a function of the conductivity state of said electron discharge device.

5. An electronic fader circuit comprising input means, an electron discharge device, a power voltage source for said electron discharge device, switching means, the conductive state of said electron discharge device controlled by the application of a bias voltage of the proper polarity by said switch means, means controlling the rate of change in the conductive state of said electron discharge device including capacitive feedback means between the input and output thereof whereby changes in the conductive state are effected at a predetermined rate, output means, first and second unilateral conduction devices respectively serially connected with opposite polarization between said input and said output means, said input means additionally connected respectively through a second unilateral conduction device and a first resistive device to said electron discharge device, said output means similarly additionally connected respectively through a third unilateral device and a second resistive device to said electron discharge device, said first and third unilateral conduction devices and said second and fourth unilateral conduction devices being respectively like-polarized with respect to said voltage source, said voltage source applied between said electron discharge device and the junction of said first and second unilateral conduction devices, whereby signals applied to said input means are selectively connected to said output means through said first and second unilateral conduction devices and at a rate proportional to the conductive state of said electron discharge device.

References Cited in the file of this patent

UNITED STATES PATENTS

| | | |
|---|---|---|
| 2,535,303 | Lewis | Dec. 26, 1950 |
| 2,591,961 | Moore | Apr. 8, 1952 |
| 2,627,039 | MacWilliams | Jan. 27, 1953 |
| 2,657,318 | Rack | Oct. 27, 1953 |
| 2,782,303 | Goldberg | Feb. 19, 1957 |

FOREIGN PATENTS

| | | |
|---|---|---|
| 155,593 | Australia | Dec. 14, 1950 |